United States Patent
Lundberg et al.

(10) Patent No.: US 11,178,024 B2
(45) Date of Patent: Nov. 16, 2021

(54) METHOD AND SCORING NODE FOR ESTIMATING A USER'S QUALITY OF EXPERIENCE FOR A DELIVERED SERVICE

(71) Applicant: Telefonaktiebolaget LM Ericsson (publ), Stockholm (SE)

(72) Inventors: Tomas Lundberg, Luleå (SE); Jing Fu, Solna (SE); Gunnar Heikkilä, Gammelstad (SE); Junaid Shaikh, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/852,842

(22) Filed: Apr. 20, 2020

(65) Prior Publication Data

US 2020/0252309 A1    Aug. 6, 2020

Related U.S. Application Data

(63) Continuation of application No. 15/023,630, filed as application No. PCT/EP2016/054763 on Mar. 7, 2016, now Pat. No. 10,666,529.

(51) Int. Cl.
*H04L 12/24* (2006.01)
*H04L 12/26* (2006.01)

(52) U.S. Cl.
CPC ........ *H04L 41/5067* (2013.01); *H04L 41/142* (2013.01); *H04L 41/147* (2013.01); *H04L 43/08* (2013.01)

(58) Field of Classification Search
CPC . H04L 41/5067; H04L 41/142; H04L 41/147; H04L 43/08

(Continued)

(56) References Cited

U.S. PATENT DOCUMENTS

| 9,053,487 | B2 * | 6/2015 | Aaron | G06Q 30/02 |
| 9,374,282 | B2 * | 6/2016 | Feiten | H04L 43/00 |

(Continued)

FOREIGN PATENT DOCUMENTS

| EP | 2571195 A1 * | 3/2013 | ........... H04L 41/147 |
| WO | 2015/073470 A1 | 5/2015 | |
| WO | WO 2015073470 A1 * | 5/2015 | ............. H04L 65/00 |

OTHER PUBLICATIONS

Performance Evaluation of Objective QoE Models for Mobile Voice and Video-Audio ServicesDr. Irina Contanis, pp. 452-457Ascom Network Testing Inc. (2013).*

(Continued)

*Primary Examiner* — Tauqir Hussain
(74) *Attorney, Agent, or Firm* — Sage Patent Group

(57) ABSTRACT

A method and a scoring node for estimating a user's Quality of Experience, QoE, when a service is delivered in a media stream to the user by means of a communication network. Quality-related parameters pertaining to the service delivery are extracted, and an individual opinion score is determined for each of a set of quality models by applying each respective quality model in the set on the quality-related parameters. An aggregated opinion score is then determined as a weighted average of the individual opinion scores. The aggregated opinion score can then be used as an estimation of the user's QoE for the service delivery, e.g. when evaluating the service and/or the communication network.

22 Claims, 3 Drawing Sheets

(58) Field of Classification Search
USPC .......................................................... 709/223
See application file for complete search history.

(56) References Cited

U.S. PATENT DOCUMENTS

| | | | | |
|---|---|---|---|---|
| 9,450,845 B2* | 9/2016 | Martins | ............... | H04L 43/0829 |
| 9,769,237 B2* | 9/2017 | Ottur | ....................... | H04L 65/80 |
| 9,794,189 B2* | 10/2017 | Rizzo | .................... | H04L 65/602 |
| 9,807,592 B2* | 10/2017 | Ramamurthi | ........... | H04W 8/18 |
| 9,813,523 B2* | 11/2017 | Bar Bracha | ............. | H04L 67/36 |
| 10,979,478 B2* | 4/2021 | Lottermann | ............ | H04L 65/80 |
| 2008/0175167 A1* | 7/2008 | Satyanarayanan | ........................... | H04L 43/0882 370/254 |
| 2010/0177650 A1* | 7/2010 | Wittgreffe | ........... | H04L 41/5009 370/252 |
| 2010/0268834 A1* | 10/2010 | Eidelman | ............ | H04L 41/5009 709/230 |
| 2010/0269044 A1* | 10/2010 | Ivanyi | ................ | H04L 41/5067 715/736 |
| 2012/0127883 A1 | 5/2012 | Chang et al. | | |
| 2013/0031575 A1* | 1/2013 | Gallant | ............... | H04L 41/5038 725/20 |
| 2013/0148525 A1* | 6/2013 | Cuadra Sanchez | ... | H04L 41/147 370/252 |
| 2013/0205002 A1* | 8/2013 | Wang | ...................... | H04L 69/16 709/224 |
| 2013/0293725 A1* | 11/2013 | Zhang | .................... | H04N 17/02 348/180 |
| 2014/0149557 A1* | 5/2014 | Lohmar | ................ | H04L 65/605 709/219 |
| 2015/0023170 A1 | 1/2015 | Kakadia et al. | | |
| 2015/0052246 A1* | 2/2015 | Kordasiewicz | .... | H04N 21/6473 709/224 |
| 2015/0222939 A1* | 8/2015 | Gallant | ................. | H04L 43/062 725/9 |
| 2015/0334153 A1 | 11/2015 | Koster et al. | | |
| 2016/0105728 A1* | 4/2016 | Schmidmer | ........ | H04N 21/6125 725/110 |
| 2016/0112732 A1* | 4/2016 | Li | ...................... | H04N 21/2662 725/116 |
| 2017/0019454 A1* | 1/2017 | Almohamedh | ......... | H04L 67/36 |
| 2018/0091386 A1* | 3/2018 | Lundberg | ............ | H04L 41/5067 |

OTHER PUBLICATIONS

International Telecommunications Union, "Parametric non-intrusive assessment of audiovisual media streaming quality", Series P: Terminals and Subjective and Objective Assessment Methods—Models and tools for quality assessment of streamed media, Recommendation ITU-T p. 1201, Oct. 2012, 32 pp.

International Search Report, Application No. PCT/EP2016/054763, dated Nov. 16, 2016.

Cotanis, "Performance Evaluation of Objective QoE Models for Mobile Voice and Video-Audio Services", 2013 IEEE 15th International Workshop on Multimedia Signal Processing (MMSP), Sep. 30, 2013, pp. 452-457 (XP032524322).

Politis et al., "A model of network related QoE for 3D video", 2012 IEEE Globecom Workshop: Quality of Experience for Multimedia Communications, Dec. 3, 2012, pp. 1335-1340 (XP032385524).

* cited by examiner

METHOD AND SCORING NODE FOR ESTIMATING A USER'S QUALITY OF EXPERIENCE FOR A DELIVERED SERVICE

CROSS-REFERENCE TO RELATED APPLICATIONS

This application is a continuation of U.S. patent application Ser. No. 15/023,630, filed on Mar. 21, 2016 which is a 35 U.S.C. § 371 national stage application of PCT International Application No. PCT/EP2016/054763, filed on Mar. 7, 2016, the disclosures and content of which are incorporated by reference herein in their entireties.

TECHNICAL FIELD

The present disclosure relates generally to a method and a scoring node, for estimating a user's Quality of Experience, QoE, when a service is delivered in a media stream to the user by means of a communication network.

BACKGROUND

Streaming of media has quickly become a very popular service which will likely continue to grow immensely such that the sales of physical products and downloads with media are likely to be more or less replaced by streaming services in due course. The services discussed in this disclosure may, without limitation, be related to streaming of audio and/or visual content such as music and video which may be delivered as on-demand services or as services related to social media.

When a service has been delivered by a service provider in a media stream by means of a communication network to a user, it is of interest for the service provider to know how the user has experienced the delivered service in terms of quality, e.g. to find out if the service or the communication network has any shortcomings that need to be eliminated or reduced in some way. This opinion of the user is commonly referred to as Quality of Experience, QoE, which is essentially the user's subjective opinion of the quality of a delivered service.

A traditional way to obtain a user's opinion about a delivered service is to explicitly ask the user to provide feedback about the service in a questionnaire or the like. For example, the service provider may send out or otherwise present an inquiry form, questionnaire, or opinion poll to the customer with various questions related to the quality of the delivered service. This procedure is however associated with various problems, as outlined below.

Firstly, it is often difficult to motivate a user to take the time and trouble to answer such questions and send a response back to the service provider and users are often notoriously reluctant to provide their opinions on such matters. Thus the response rate is typically too low to provide a representative result. One way to motivate the user is to reward him/her in some way when submitting a response, e.g. by giving some gift or discount, which means added costs for the service provider. Secondly, it may also happen that once the user answers such questions some time may have passed and he/she may not remember exactly how the service quality was perceived, and the response may thus be less than truthful.

Subjective test may also be conducted where a panel of users is asked to evaluate perceived quality of some streamed media. Typically the quality is given as a score on a scale from, e.g., 1, indicating "bad", to 5, indicating "excellent". The scores may then be averaged over the participating users to form a representative opinion score, which may also be referred to as a quality score, also commonly called a subjective Mean Opinion Score, MOS. The results can be used for evaluating the service, e.g. for finding improvements to make. However, such subjective panel tests are costly and time consuming.

Further problems include that panel tests and questionnaires can in practice only be conducted for a limited number of users which may not be representative for all users of a service, and that the feedback cannot be obtained in "real-time", that is immediately after service delivery. Further problems include that considerable efforts must be spent to either conduct a panel test or distribute a questionnaire to a significant but still limited number of users and evaluate the results which could be more or less trustworthy.

Objective methods for estimating QoE have been developed as an alternative to subjective panel tests and questionnaires, which use a predefined "quality model" to automatically produce an opinion score by applying the quality model on technical parameters of a service delivery. However, the resulting opinion score may sometimes not be representative or truthful depending on the circumstances in real service deliveries which circumstances may not match or be valid for the used quality model.

SUMMARY

It is an object of embodiments described herein to address at least some of the problems and issues outlined above. It is possible to achieve this object and others by using a method and a scoring node as defined in the attached independent claims.

According to one aspect, a method is provided for estimating a user's Quality of Experience, QoE, when a service is delivered in a media stream to the user by means of a communication network. In this method, quality-related parameters pertaining to the service delivery are extracted, and a set of quality models configured to estimate service quality is obtained. Further, an individual opinion score is determined for each of the quality models in the set by applying each respective quality model in the set on the extracted quality-related parameters. An aggregated opinion score is then determined as a weighted average of the individual opinion scores, wherein the aggregated opinion score is used as an estimation of the user's quality of experience for the service delivery.

According to another aspect, a scoring node is arranged to estimate a user's quality of experience, QoE, when a service is delivered in a media stream to the user by means of a communication network. The scoring node is configured to extract quality-related parameters pertaining to the service delivery, and to obtain a set of quality models configured to estimate service quality. The scoring node is further configured to determine an individual opinion score for each of the quality models in the set by applying each respective quality model in the set on the extracted quality-related parameters. The scoring node is further configured to determine an aggregated opinion score as a weighted average of the individual opinion scores, wherein the aggregated opinion score can be used as an estimation of the user's quality of experience for the service delivery.

According to yet another aspect, a scoring node is arranged to estimate a user's quality of experience, QoE, when a service is delivered in a media stream to the user by means of a communication network. The scoring node comprises an extracting module configured to extract quality-related parameters pertaining to the service delivery, and an obtaining module configured to obtain a set of quality models configured to estimate service quality. The scoring node further comprises a determining module configured to determine an individual opinion score for each of the quality models in the set by applying each respective quality model in the set on the extracted quality-related parameters. The determining module is also configured to determine an aggregated opinion score as a weighted average of the individual opinion scores, wherein the aggregated opinion score can be used as an estimation of the user's quality of experience for the service delivery.

The above method and scoring node may be configured and implemented according to different optional embodiments to accomplish further features and benefits, to be described below.

A computer program storage product is also provided comprising computer readable instructions which, when executed on the scoring node, cause the scoring node to carry out the method described above.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to determine an opinion score that is more trustworthy and accurate than what can be achieved by means of conventional procedures, by taking into account more than just one quality model. In more detail, a set of plural predefined quality models are applied on technical quality-related parameters pertaining to a service delivery, to determine an individual opinion score for each of the quality models. Then, a final opinion score is determined as a weighted average of the determined individual opinion scores. In this solution the resulting final opinion score is hereafter referred to as an "aggregated opinion score", also denoted $MOS_{agg,final}$.

Thereby, the influence of the different quality models on the aggregated opinion score can be controlled by applying weights to the individual opinion scores. For example, applying the same weight to all the individual opinion scores will provide equal influence of all the corresponding quality models, while the influence of a certain quality model can be amplified by applying a higher weight to its corresponding individual opinion score, or vice versa. If a certain quality model is deemed to be particularly relevant for the circumstances of a service delivery, this quality model can thus be given a relatively high weight in this solution.

The solution and embodiments thereof will be described herein in terms of functionality in a "scoring node" which is basically configured to estimate a user's QoE when a service is delivered in a media stream to the user by means of a communication network. The scoring node should however be seen as a logic entity that may be implemented in the communication network or as a separate entity having access to various quality-related parameters pertaining to service deliveries over the communication network.

Figure 2:
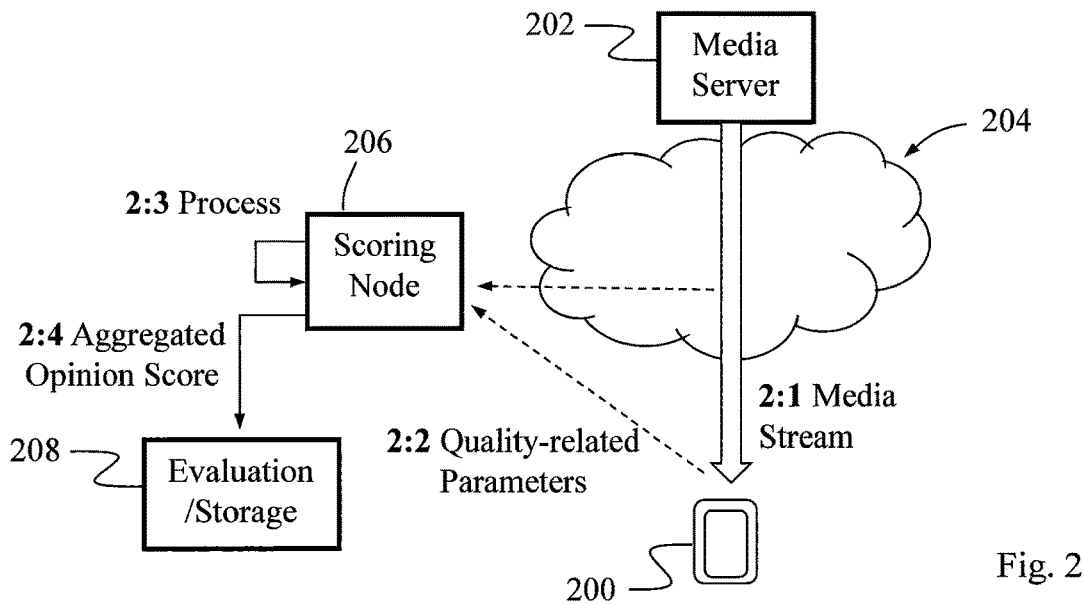
FIG. 2 is a communication scenario illustrating an example of how the solution may be employed, according to some possible embodiments.

A simplified communication scenario illustrating how the solution may be employed is shown in FIG. 2 where a user of a communication device 200 receives a media stream as a service delivery from a media server 202 of a service provider over a communication network 204, as illustrated by an action 2:1. It is assumed that the media stream contains audio and/or video content that can be played out on the user's device 200 which may also be referred to as a "streaming device". The communication device 200 may be a wireless device and the communication network 204 may be a cellular or wireless network which sends the media stream to the device 200 over a suitable radio link depending on the technology used. The solution is not limited to any particular technology of this communication.

In another action 2:2, the scoring node 206 extracts quality-related parameters pertaining to the service delivery. For example, the quality-related parameters may reflect the play-out quality of video or audio, or both. The quality-related parameters may further reflect any delays occurring in the play-out. The quality-related parameters extracted in this action may be obtained when reported to the scoring node 206 either from the user's device 200 or from the communication network 204, e.g. in one or more messages over an IP (Internet Protocol) network. In this communication any of the following protocols may, without limitation, be used: the Hyper-Text Transfer Protocol, HTTP, the User Datagram Protocol, UDP, the Transmission Control Protocol, TCP, and the Real-time Transport Protocol, RTP.

The scoring node 206 then processes the quality parameters in a further action 2:3 by applying multiple predefined quality models on them to determine an individual opinion score for each of the quality models. Finally, an aggregated opinion score is determined as a weighted average of the individual opinion scores, as illustrated by an action 2:4. The resulting aggregated opinion score may then be used as an estimation of the user's QoE for the service delivery, e.g. when evaluating the service and/or the performance of the communication network 204.

For example, the determined aggregated opinion score may be sent to a service evaluation system, or saved in a storage, as indicated schematically by numeral 208 in FIG. 2. The protocol used for sending the aggregated opinion score to a service evaluation system or storage 208 may be HTTP or FTP. The service evaluation system or storage may comprise a Structured Query Language, SQL, database or any other suitable type of database that can be used for maintaining aggregated opinion scores determined for various service deliveries.

It was mentioned above that objective methods for estimating QoE have been developed which do not require any input from a user. It will now be described how such methods can be employed according to conventional procedures. In these objective QoE estimation methods, a predefined "quality model" is used to automatically produce an opinion score by applying the model on various technical parameters related to the service delivery. Such quality models can be trained on sets of subjective scores that have been provided by users as described above, so that the quality models follow the users' subjective scores as closely as possible.

The resulting opinion score produced from a quality model is thus useful as an indication of the QoE as subjectively perceived by a user, even though the opinion score is determined solely from "objective" technical parameters which can thus be performed automatically without relying on input from real users. Examples of how technical parameters can be used as input to a quality model for determining an opinion score are described in "*Parametric non-intrusive assessment of audiovisual media streaming quality*", ITU-T P.1201 (December 2012).

When the transmission capacity of a communication network fluctuates for a certain ongoing media stream, e.g. where a wireless connection is used for transmitting the media stream to a user as delivery of a service, the receiving media player can often select to adapt the bitrate so that the received media can still be played out, albeit sometimes with reduced quality.

Figure 1:
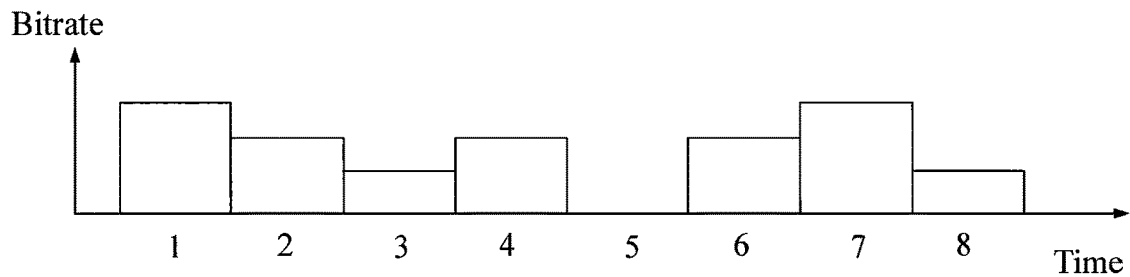
FIG. 1 is a diagram illustrating an example of how bitrate of a played out media stream may vary during a succession of time segments.

A simplified but illustrative example of how the bitrate of a media stream when played out may vary over time is depicted in FIG. 1, e.g. depending on the current transmission capacity of the communication network used, typically involving various communication links such as a wireless radio link. The bitrate that can be achieved in transmission over a radio link is typically dependent on the current radio conditions related to coverage and interference. The bitrate of the media stream when played out naturally impacts the QoE so that a high received bitrate typically provides better resolution and fewer disturbances in the play-out than a low received bitrate.

In this figure, the bitrate at play-out is averaged in successive time segments 1-8 such that the bitrate is shown to vary in a step-wise fashion. It can be seen that the bitrate is relatively high in time segment 1 and decreases in time segments 2-3, and so forth. In time segment 5, no bits are played out at all which indicates an interruption in the play-out which may be caused by buffering of bits when the play-out has been faster than the transmission of bits resulting in empty buffer in the receiving equipment.

The above-mentioned quality models may be used for determining an opinion score for a given media clip or the like, comprised of time segments with different bitrates, such that an opinion score is determined for each time segment. A total opinion score, sometimes referred to as an aggregated MOS, can then be obtained for the entire media clip across all the time segments by determining a representative average of all the opinion scores for the time segments. The aggregated MOS determined in this manner can be seen as an objective MOS, as opposed to the above-described subjective MOS which was determined from input provided by users.

However, it has been recognized in the solution described herein that the currently proposed quality models sometimes produce opinion scores which may not be very accurate or even misleading. Different types of quality models may have their own strengths and weaknesses and a certain quality model may be accurate for certain service characteristics but less accurate for other service characteristics or circumstances, e.g. depending on which technical parameters are used as input to the respective quality model and on the current circumstances and the values of these parameters when the service is delivered.

An example will now be described, with reference to the flow chart in FIG. 3, of how the solution may be employed in terms of actions which may be performed in a scoring node or the equivalent, such as the above-described scoring node 206, for estimating a user's QoE when a service is delivered in a media stream to the user by means of a communication network. Reference will sometimes also be made, without limiting the features described, to the example shown in FIG. 2. The procedure illustrated by FIG. 3 can thus be used to accomplish the functionality described above for the scoring node 206.

A first action 300 illustrates that quality-related parameters pertaining to the service delivery are extracted, e.g. in connection with reception of the media stream at the device 200 and/or play-out of the media stream on the device 200. It was mentioned above that quality-related parameters may be obtained from the device 200 and/or from the communication network 204. One possible but non-limiting way of implementing this action is to collect the parameters in a parameter storage node, not shown, which node could be used for storing, at least temporarily, various collected quality-related parameters which are available for retrieval by the scoring node 206 whenever the procedure of FIG. 3 is performed. Alternatively, the device 200 and/or the communication network 204 may send measured quality-related parameters directly to the scoring node 206 e.g. on a more or less continuous basis. A set of predefined quality models configured to estimate service quality are also obtained in an action 302. The predefined quality models may be available from a suitable storage located either within the scoring node 206 or at some other accessible entity.

Then, an individual opinion score is determined for each of the quality models in the set, shown by an action 304, by applying each respective quality model in the set on the extracted quality-related parameters. In a final action 306, an aggregated opinion score is determined as a weighted average of the individual opinion scores, wherein the aggregated opinion score is used as an estimation of the user's Quality of Experience, QoE, for the service delivery. The scoring node 206 may thus have suitable logic or software configured to determine the individual opinion scores and then the aggregated opinion score. Some examples of how this determination may be performed in more detail will be described later below.

Each of the quality models may have its own strengths and weaknesses depending on the circumstances of the service delivery, and it is an advantage of this solution that several different types of specific quality models can be combined in the set of quality models such that each model's strengths can be utilized without having too much influence of its weaknesses, if any. A resulting aggregated opinion score can thus be obtained that is more accurate and relevant to the current circumstances than if the quality models were to be used separately, i.e. just one model at a time, as in conventional procedures.

Some non-limiting example embodiments that can be used in the above procedure, will now be described. In a possible embodiment, the aggregated opinion score may be determined as a sum of the individual opinion scores multiplied with corresponding model weights. An advantage of this embodiment is that the influence of each quality model in the set can be controlled by selecting the weight to be multiplied to the corresponding individual opinion score.

The model weights may be either variable or fixed. In another possible embodiment, if variable model weights are used, the model weights may be optimized by minimizing errors $err_n$, said errors $err_n$ being a difference between the respective individual opinion score n and the aggregated opinion score. In that case, another possible embodiment may be that the optimized model weights $w_1, \ldots w_M$ for M quality models are determined by minimizing a Root Mean Square Error, RMSE, calculated from the errors $err_n$ as:

$$RMSE = \sqrt{\frac{1}{N}\sum_{n=1}^{N}\left(err_n(w_1, \ldots, w_M)\right)^2}$$

Another alternative embodiment may be that the optimized model weights $w_1, \ldots w_M$ for M quality models are determined by minimizing the length of a vector comprising said errors ($err_1, err_2, \ldots, err_N$) as coordinates, using an $L^p$ norm according to:

$$\|err\|_p = (|err_1|^p + |err_2|^p + \ldots + |err_N|^p)^{\frac{1}{p}}$$

The model weights may be adapted dependent on various parameters related to the circumstances of the service delivery, in order to weight the different quality models in a way that is suitable or relevant for the current service delivery circumstances. For example, it may be known that a certain quality model performs better than others under some particular circumstances and if so that quality model can be given greater weight than the other quality models. In further possible embodiments, at least one of the model weights may be adjusted based on service delivery circumstances comprising at least one of:
  A) A detected degradation of the service delivery, such as when the play-out bitrate decreases or when interruptions occur in the play-out, e.g. due to reduced or interrupted transmission of the media stream.
  B) A detected change of the quality-related parameters during the service delivery, such as reduced audio quality and/or video quality.
  C) Type of media content in the media stream, such as e.g. a sport video with much rapid movements, or some classical music requiring high sound quality.
  D) Characteristics of the user, such as e.g. age, gender, profession, interests, and so forth.
  E) Time of day for the service delivery.

Instead of using variable model weights, the model weights may in another possible embodiment be predefined and fixed, as mentioned above.

In another possible embodiment, the individual opinion scores may be determined further based on characteristics of a communication device used by the user for receiving the media stream. Thus, information of the device such as type or model, screen resolution and audio equipment, may be used in addition to the above-mentioned quality-related parameters as input to the operation in action 304 of determining an individual opinion score is for the quality models in the set.

In further possible embodiments, the quality-related parameters may be related to at least one of video play-out quality, audio play-out quality, packet loss, and delays caused by buffering of the media and/or by transmission of the media through the communication network. In yet another possible embodiment, extracting the quality-related parameters may comprise obtaining measurements of the quality-related parameters made by the communication device 200 used for receiving the media stream, or by a node, not shown if FIG. 2, that is used for handling the media stream in the communication network 204.

Figure 4:
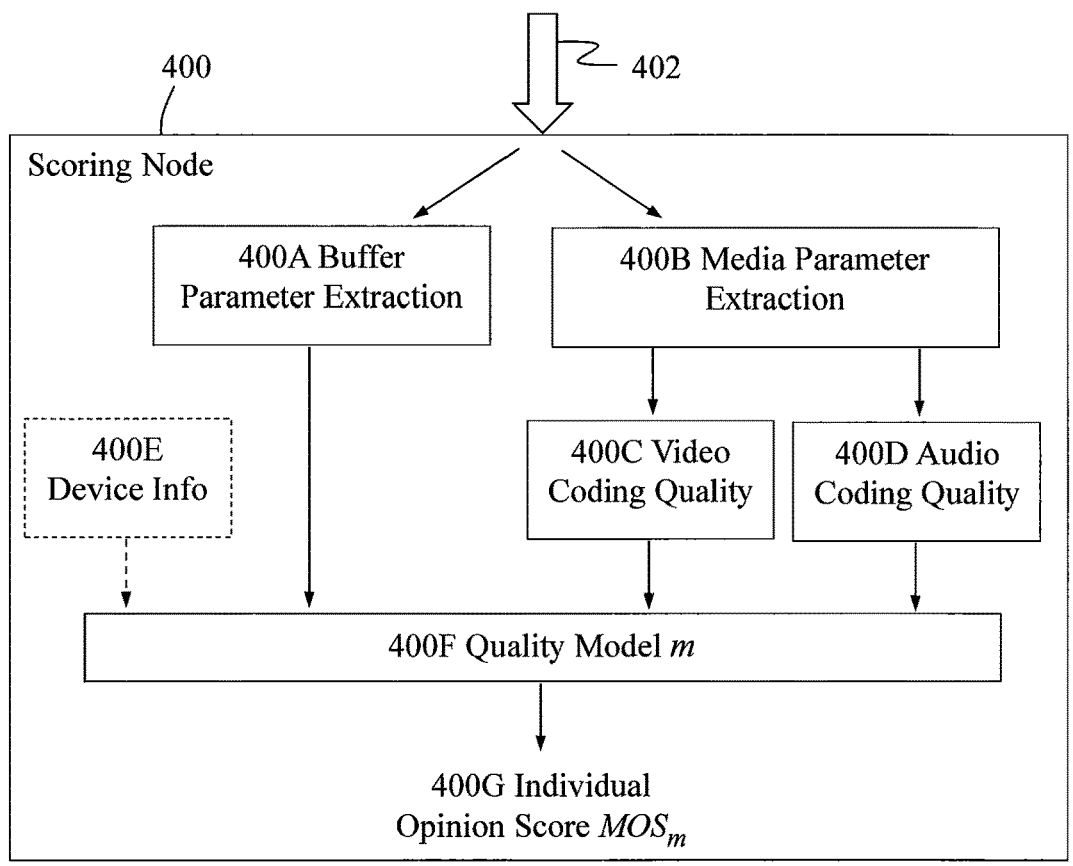
FIG. 4 is a logic diagram illustrating an example of operations that may be executed in a scoring node when the solution is used, according to further possible embodiments.

The block diagram in FIG. 4 illustrates schematically a non-limiting example of how a scoring node 400 may operate to determine an individual opinion score for a service delivery, as of the above-described action 304. It was mentioned that each respective quality model in the obtained set of quality models is applied on the extracted quality-related parameters. This figure thus illustrates how one of these quality models, here denoted quality model m, is used for determining a corresponding individual opinion score, here denoted $MOS_m$.

The arrow 402 represents schematically reception of quality-related parameters pertaining to the service delivery which can be received/extracted from the user's device or from the network, as mentioned above. A block 400A illustrates that the scoring node 400 extracts buffer related parameters which may indicate the amount of information in the buffer of the user's device waiting for play-out. If the buffer is virtually empty, it is likely that the play-out will be disturbed in some way, e.g. by interruption or reduced quality. Another block 400B illustrates that the scoring node 400 also extracts media related parameters which are indicative of video quality in block 400C, and audio quality in block 400D, in the play-out on the user's device. A further block 400E indicates that the scoring node 400 may also obtain information about the device used for playing out the media stream. Some examples of such device information, or communication device characteristics, were mentioned above.

Block 400F illustrates that the scoring node 400 applies the quality model m on the extracted quality-related parameters extracted according to blocks 400A-E to determine the individual opinion score $MOS_m$, as indicated by numeral 400G.

Figure 5:
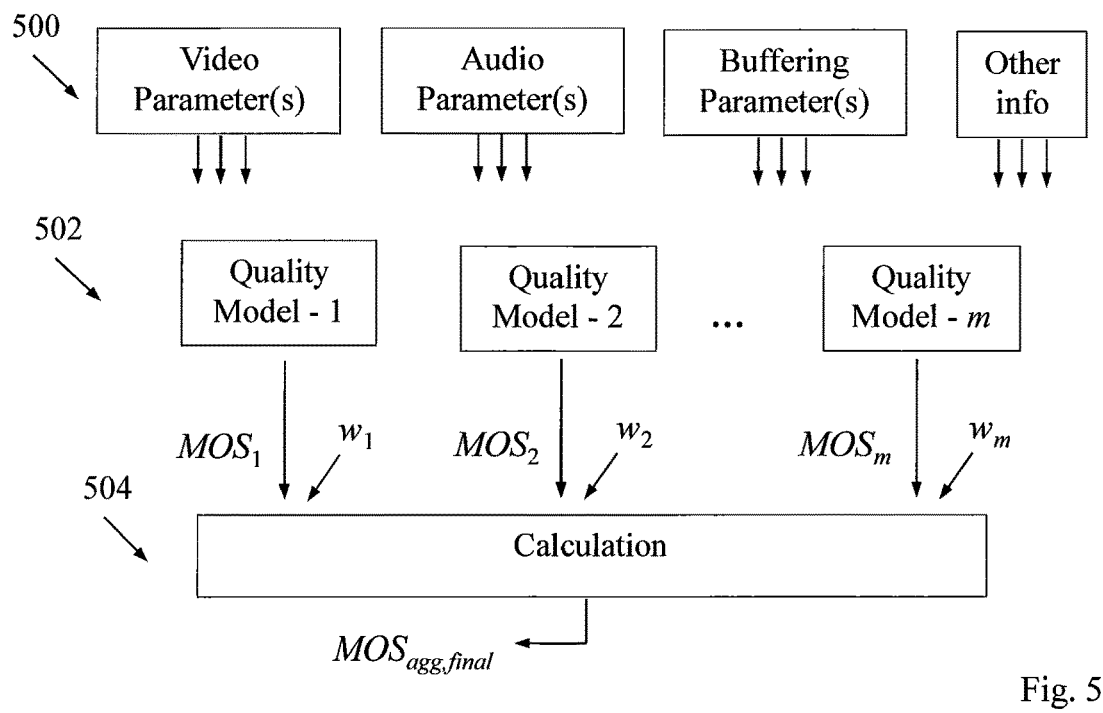
FIG. 5 is another logic diagram illustrating an example of how various parameters and information may be processed when the solution is used, according to further possible embodiments.

The block diagram in FIG. 5 further illustrates how the scoring node 400 may determine the aggregated opinion score $MOS_{agg,final}$ from multiple individual opinion scores $MOS_1$-$MOS_m$ which have been determined by means of a set of corresponding quality models 1-m in the manner shown in FIG. 4. Numeral 500 indicates that the quality-related parameters and device information of blocks 400A-E are inputted to the quality models 1-m for determining corresponding individual opinion scores $MOS_1$-$MOS_m$. Then numeral 502 indicates that the individual opinion scores $MOS_1$-$MOS_m$ are inputted with corresponding weights $w_1$-$w_m$ to the calculation of the aggregated opinion score $MOS_{agg,final}$ in block 504, which was described for action 306 above.

Figure 6:
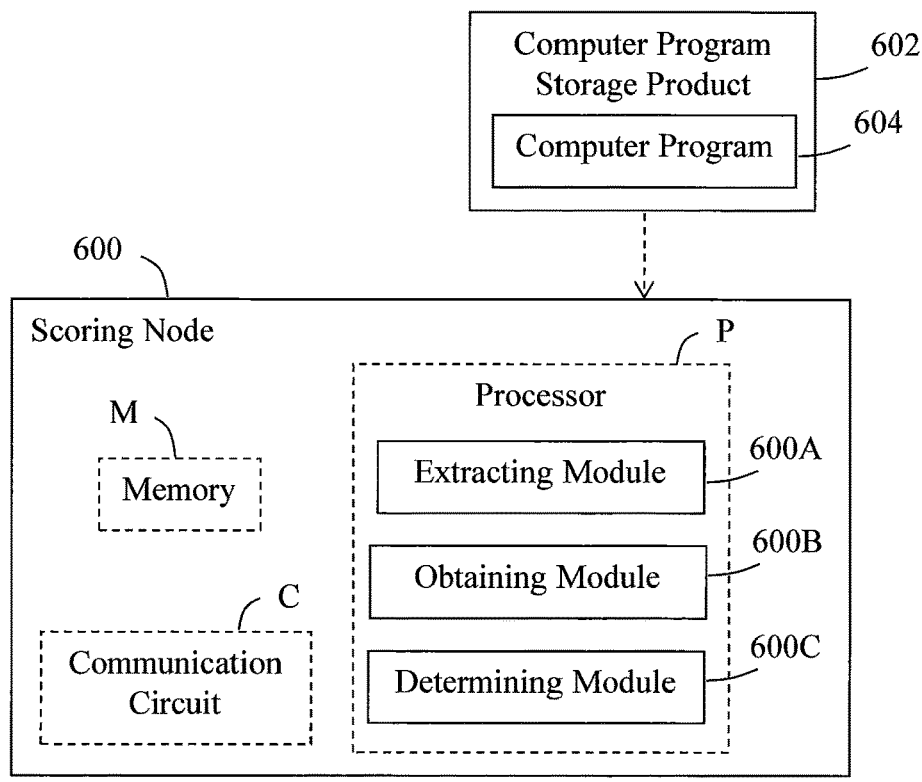
FIG. 6 is a block diagram illustrating a scoring node in more detail, according to further possible embodiments.

The block diagram in FIG. 6 illustrates a detailed but non-limiting example of how a scoring node 600 may be structured to bring about the above-described solution and embodiments thereof. The scoring node 600 may be configured to operate according to any of the examples and embodiments of employing the solution as described above, where appropriate, and as follows. The scoring node 600 is shown to comprise a processor P and a memory M, said memory comprising instructions executable by said processor P whereby the scoring node 600 is operative as described herein. The scoring node 600 also comprises a communication circuit C with suitable equipment for receiving and transmitting information in the manner described herein.

The communication circuit C is configured for communication with devices for media playing and similar user equipment, using suitable protocols depending on the implementation. This communication may be performed in a conventional manner over a communication network employing radio links for wireless communication with the vehicles involved, which is not necessary to describe here as such in any detail. The solution and embodiments herein are thus not limited to using any specific types of networks, technology or protocols for radio communication and other communication.

Figure 3:
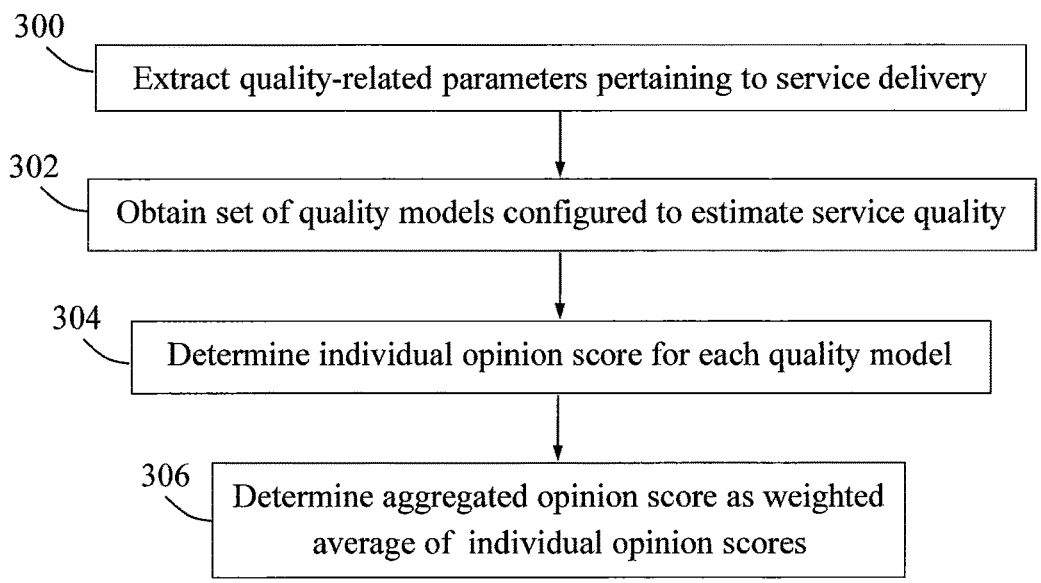
FIG. 3 is a flow chart illustrating a procedure for estimating a user's experience of service quality, according to further possible embodiments.

The scoring node 600 comprises means configured or arranged to perform the actions 300-306 of the flow chart in FIG. 3. The scoring node 600 is arranged to estimate a user's Quality of Experience, QoE, when a service is delivered in a media stream to the user by means of a communication network.

The scoring node 600 is configured to extract quality-related parameters pertaining to the service delivery. This operation may be performed by an extracting module 600A in the scoring node 600, e.g. in the manner described for action 300 above. The scoring node 600 is further configured to obtain a set of quality models configured to estimate service quality. This operation may be performed by an obtaining unit 600B in the scoring node 600, e.g. as described for action 302 above.

The scoring node 600 is also configured to determine an individual opinion score for each of the quality models in the set by applying each respective quality model in the set on the extracted quality-related parameters. This operation may be performed by a determining unit 600C in the scoring node 600, e.g. as described for action 304 above. The scoring node 600 is also configured to determine an aggregated opinion score as a weighted average of the individual opinion scores, wherein the aggregated opinion score can be used as an estimation of the user's quality of experience for the service delivery. This operation may be performed by the determining unit 600C, e.g. as described for action 306 above.

It should be noted that FIG. 6 illustrates various functional units in the scoring node 600, and the skilled person is able to implement these functional units in practice using suitable software and hardware. Thus, the solution is generally not limited to the shown structures of the scoring node 600, and the functional units 600A-C therein may be configured to operate according to any of the features and embodiments described in this disclosure, where appropriate.

The functional units 600A-C described above can be implemented in the scoring node 600 by means of suitable hardware and program modules of a computer program comprising code means which, when run by the processor P causes the scoring node 600 to perform at least some of the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the scoring node 600 in the form of a memory having a computer readable medium and being connected to the processor P. The computer program product or memory in the scoring node 600 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or hard drive storage (HDD), and the program modules could in alternative embodiments be distributed on different computer program products in the form of memories within the scoring node 600.

The solution described herein may be implemented in the scoring node 600 by means of a computer program storage product 602 comprising a computer program 604 with computer readable instructions which, when executed on the scoring node 600, cause the scoring node 600 to carry out the actions according to any of the above embodiments, where appropriate.

Some examples of how the scoring node 206 or 600 may determine the individual opinion scores and the aggregated opinion score in accordance with the procedure of FIG. 3, will now be described in more detail.

It is assumed that a number M of specific quality models are obtained, where the m:th model produces a specific individual opinion score, here denoted $MOS_{agg,m}$, and which takes as input a set of quality-related parameters, denoted $f_{m,1}$, $f_{m,2}$, . . . . A final aggregated quality score denoted $MOS_{agg,final}$ is then determined by calculating the weighted sum of the individual opinion scores of the M quality models as follows:

$$MOS_{agg,final} = \sum_{m=1}^{M} w_m MOS_{agg,m}(f_{m,1}, f_{m,2}, ...)$$

Where $w_m$ is the weight for quality model m, which is also limited by $0 \leq w_m \leq 1$. In this example the sum of all the weights $w_1$-$w_M$ are also constrained to be equal to 1, i.e.

$$\sum_{m=1}^{M} w_m = 1$$

However, the solution is also possible to use without the above two constraints to the weights. As mentioned above, the weights may be constant, i.e. fixed, but it is also possible that the weights themselves are dependent on some features which depend on circumstances during delivery of the service, hereafter called "weight-related features", here denoted $\gamma_{m,l}$, so that $$MOS_{agg,final} = \sum_{m=1}^{M} w_m(\gamma_{m,1}, \gamma_{m,2}, ...) MOS_{agg,m}(f_{m,1}, f_{m,2}, ...)$$

but still with the constraint $$\sum_{m=1}^{M} w_m(\gamma_{m,1}, \gamma_{m,2}, ...) = 1$$

The weight-related features $\gamma_{m,l}$ thus correspond to the above-mentioned service delivery circumstances. Some illustrative but non-limiting examples A-E of service delivery circumstances have been presented above. Such weight-related features could for instance be used if it is known that one specific aggregation model performs better under some circumstances that are not covered by the quality-related parameters. Examples of such circumstances have been mentioned above which could include the type of media content such as film, sports, music, etc., the age of the user, the time of day, etc. The weight-related features $\gamma_{m,l}$ could then be chosen to reflect these circumstances and will modify the weights accordingly.

It is also possible to envisage situations where the model weights are varied dynamically, e.g. by using some kind of "outer loop" where the final aggregated quality score $MOS_{agg,final}$ is optimized against some "external measure" which will be explained later below with reference to FIG. 7.

It will now be described how "optimal" fixed model weights may be determined for the respective quality models. It is assumed that a set of N subjective MOS scores $MOS_{subj,n}$ are used with corresponding quality-related parameters $f_{n,1}, f_{n,2}, \ldots$. These subjective MOS scores have been obtained as the averaged result of subjective tests where a panel of users has graded a test service such as a video. It is further assumed that a set of M specific quality models are used with corresponding weights $w_1, \ldots, w_M$. The final aggregated quality score $MOS_{agg,final}$ obtained from these quality-related parameters and quality models will then be dependent not only on the quality-related parameters themselves but also on the weights, i.e. $MOS_{agg,final,n}(w_1, \ldots, w_M; f_{n,1}, f_{n,2}, \ldots)$. The error between each individual quality score and the determined final aggregated quality score $MOS_{agg,final}$ will then also be dependent on the weights as follows:

$$err_n(w_1, \ldots, w_M) \times MOS_{subj,n} - MOS_{agg,final,n}$$
$$(w_1, \ldots, w_M; f_{n,1}, f_{n,2}, \ldots)$$

To find the "optimal" weights, the errors should be minimized in some sense which may be done as follows. A commonly used error measure is the Root Mean Square Error, RMSE. The optimal weights can then be found by minimizing the RMSE as follows:

$$RMSE = \sqrt{\frac{1}{N} \sum_{n=1}^{N} \left(err_n\left(w_1, \ldots, w_M\right)\right)^2}$$

Another option is to consider the errors ($err_1, err_2, \ldots, err_N$) as coordinates of a vector err in an N-dimensional vector space. In this option the optimal weights can be found by minimizing the length, or norm, of the vector using for instance the so-called $L^p$ norm as follows:

$$\|err\|_p = (|err_1|^p + |err_2|^p + \ldots + |err_N|^p)^{\frac{1}{p}}$$

Setting p=2 will essentially give the RMSE, up to a constant factor, while p=1 is essentially the average absolute deviation. Letting p=∞ will result in the so-called Chebyshev or maximum norm.

After having decided which error metric to use, e.g. RMSE, the task is then to find those weights that minimizes the error metric, which can be regarded as the optimal weights. The problem of finding those weights that minimizes the selected error metric is well-known in the art, and basically any conventional method can be used, e.g. gradient descent, or machine learning with cross-validation.

Sometimes there might be reasons for not using exactly the optimal weights as described above. It might for instance be desired to some extent emphasize certain subsets of the input set of quality-related parameters. This can be accomplished e.g. by using a weighted norm as the error metric, for instance as follows:

$$\|err_{weighted}\|_p = (\omega_1|err_1|^p + \omega_2|err_2|^p + \ldots + \omega_N|err_N|^p)^{\frac{1}{p}}$$

where $\omega_n$ is the weight for the input subset of quality-related parameters $f_{n,1}, f_{n,2}, \ldots$. A higher value for $\omega_n$ for the input subset of quality-related parameters $f_{n,1}, f_{n,2}, \ldots$ will put more emphasis on that subset of quality-related parameters compared with the rest of the set. It can be noted that the norm weights $\omega_n$ are not related to the weights used in the sum for the final aggregated hybrid MOS score previously discussed.

In another example it could be desired to some extent emphasize the smoothness of the functional models over the typically "jagged" Machine Learning, ML, models that would be obtained if machine learning procedures are employed. One way to achieve this is to put additional constraints on the model weights $w_m$, i.e. in addition to the previously mentioned condition $$\sum_{m=1}^{M} w_m = 1$$

Such additional constrains that may be applied on the model weights may include $$w_i > 0.75$$

Then the RMSE may be minimized according to this constraint. This means that at least 75% of the final aggregated quality score will be influenced by model i.

It will now be described how the model weights may be dynamically modified for the respective quality models. FIG. 7 shows how an outer loop can be used to dynamically modify and optimize the model weights through the above-described weight-related features $\gamma_{m,1}, \gamma_{m,2}, \ldots$. First, a final aggregated quality score $MOS_{agg,final}$ is determined in a block 700 using weights $w_m$ determined from initial weight-related features $\gamma_{m,1}, \gamma_{m,2}, \ldots$. The resulting aggregated quality score $MOS_{agg,final}$ is then compared with some external measure and the performance of the whole aggregated hybrid model is evaluated in a block 702. If the performance is not satisfactory, new weight-related features can be calculated in a block 704, e.g. similar to the procedure described above, and the new weight-related features will then be used in subsequent calculations of the final aggregated quality score $MOS_{agg,final}$, and so forth.

Figure 7:
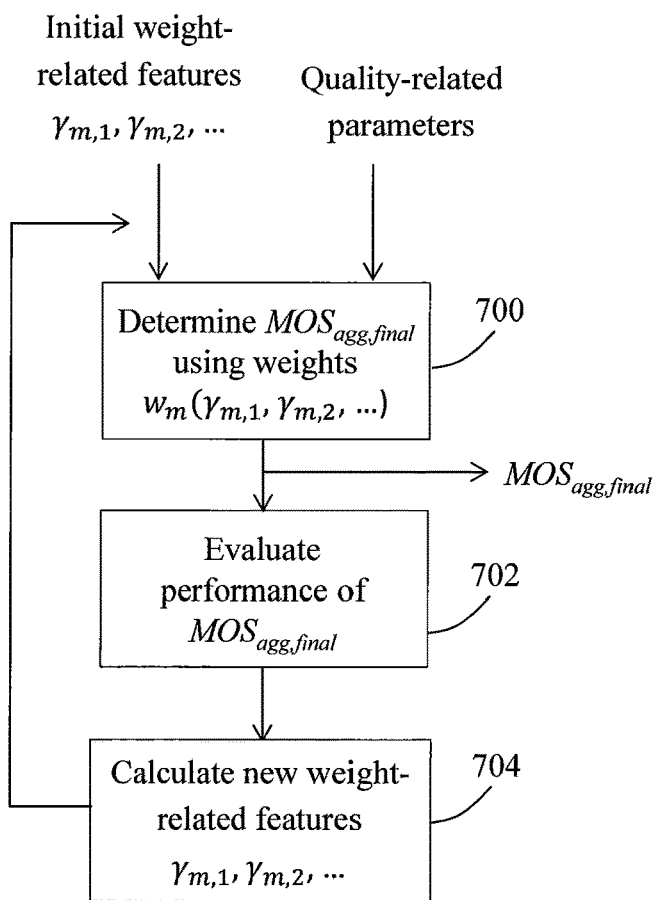
FIG. 7 is a flow chart illustrating an example of how weight parameters may be determined for use when determining an aggregated opinion score, according to further possible embodiments.

It may not be necessary to apply the outer loop of FIG. 7 every time an aggregated quality score is determined for a service delivery, but the loop could instead be set to run, e.g., only once per day or once per week. The above-mentioned "external measure" could be obtained by running known test sequences with known quality-related parameters and known subjective opinion scores through the model.

It may be noted that the outer loop scheme of FIG. 7 may also work directly with the above-described "constant" weights $w_m$, which in that case would not really be constant, instead of indirectly through the weight-related features $\gamma_{m,1}, \gamma_{m,2}, \ldots$.

The weights could also be dynamically modified depending on the above-described set of quality-related parameters. This would then be used as additional input to block 700 as shown in FIG. 7. An example where this could be used may be when it is known that one specific quality model performs better than others under some particular circumstances, e.g. during buffering. Then this model could be given a higher weight during those circumstances.

The above-described two ways of dynamically modifying the weights, i.e. through an open loop or depending on the features, can be used either together at the same time, or separately i.e. either of the two ways.

While the solution has been described with reference to specific exemplifying embodiments, the description is generally only intended to illustrate the inventive concept and should not be taken as limiting the scope of the solution. For example, the terms "scoring node", "quality-related parameters", "aggregation model", "individual opinion score", "aggregated opinion score", and "model weight" have been used throughout this disclosure, although any other corresponding entities, functions, and/or parameters could also be used having the features and characteristics described here. The solution is defined by the appended claims.

The invention claimed is:

1. A method for estimating a user's Quality of Experience (QoE) when a service is delivered in a media stream to the user by a communication network, the method comprising:
   extracting quality-related parameters pertaining to the service delivery;
   obtaining a set of quality models configured to estimate service quality;
   determining an individual opinion score for each of the quality models in the set by applying each respective quality model in the set on the extracted quality-related parameters, wherein determining the individual opinion score comprises determining an individual opinion score for different time segments of the delivered media stream by applying each respective quality model in the set to the extracted quality-related parameters associated with each respective different time segment of the delivered media stream; and
   determining an aggregated opinion score as a weighted average of the individual opinion scores, wherein the aggregated opinion score is used as an estimation of the user's quality of experience for the service delivery,
   wherein the individual opinion scores are determined further based on characteristics of a communication device used by the user for receiving the media stream.

2. The method according to claim 1, wherein the aggregated opinion score is determined as a sum of the individual opinion scores multiplied with corresponding model weights.

3. The method according to claim 2, wherein at least one of the model weights is adjusted based on service delivery circumstances comprising at least one of:
   a detected degradation of the service delivery,
   a detected change of the quality-related parameters during the service delivery,
   type of media content in the media stream,
   characteristics of the user, and
   time of day for the service delivery.

4. The method according to claim 2, wherein the model weights are predefined and fixed.

5. The method according to claim 1, wherein the quality-related parameters are related to at least one of video play-out quality, audio play-out quality, and delays caused by buffering of the media and/or by transmission of the media through the communication network.

6. The method according to claim 1, wherein extracting the quality-related parameters comprises obtaining measurements of the quality-related parameters made by the user's communication device used for receiving the media stream.

7. The method according to claim 1, wherein extracting the quality-related parameters comprises obtaining measurements of the quality-related parameters made by a node handling the media stream in the communication network.

8. The method according to claim 1, wherein determining the aggregated opinion score comprises determining the aggregated opinion score as a weighted average of the individual opinion scores determined for each of the different time segments of the delivered media stream.

9. The method according to claim 1, wherein extracting quality-related parameters pertaining to the service delivery delivered in the media stream comprises extracting a bitrate associated with each different time segment of the media stream.

10. A scoring node arranged to estimate a user's Quality of Experience (QoE) when a service is delivered in a media stream to the user by a communication network, the scoring node comprising:
    a processor and a memory, the memory comprising instructions that when executed by the processor causes the processor to operate to:
    extract quality-related parameters pertaining to the service delivery;
    obtain a set of quality models configured to estimate service quality;
    determine an individual opinion score for each of the quality models in the set by applying each respective quality model in the set on the extracted quality-related parameters, wherein determining the individual opinion score comprises determining an individual opinion score for different time segments of the delivered media stream by applying each respective quality model in the set to the extracted quality-related parameters associated with each respective different time segment of the delivered media stream; and
    determine an aggregated opinion score as a weighted average of the individual opinion scores, wherein the aggregated opinion score is used as an estimation of the user's quality of experience for the service delivery,
    wherein the individual opinion scores are determined further based on characteristics of a communication device used by the user for receiving the media stream.

11. The scoring node according to claim 10, wherein the aggregated opinion score is determined as a sum of the individual opinion scores multiplied with corresponding model weights.

12. The scoring node according to claim 11, wherein at least one of the model weights is adjusted based on service delivery circumstances comprising at least one of:
    a detected degradation of the service delivery,
    a detected change of the quality-related parameters during the service delivery,
    type of media content in the media stream,
    characteristics of the user, and
    time of day for the service delivery.

13. The scoring node according to claim 11, wherein the model weights are predefined and fixed.

14. The scoring node according to claim 10, wherein the quality-related parameters are related to at least one of video play-out quality, audio play-out quality, and delays caused by buffering of the media and/or by transmission of the media through the communication network.

15. The scoring node according to claim 10, wherein the memory further comprises instructions that when executed by the processor causes the processor to operate to extract the quality-related parameters by obtaining measurements of the quality-related parameters made by the user's communication device used for receiving the media stream.

16. The scoring node according to claim 10, wherein the memory further comprises instructions that when executed by the processor causes the processor to operate to extract the quality-related parameters by obtaining measurements of the quality-related parameters made by a node handling the media stream in the communication network.

17. The scoring node according to claim 10, wherein the memory further comprises instructions that when executed by the processor causes the processor to operate to determine the aggregated opinion score by determining the aggregated opinion score as a weighted average of the individual opinion scores determined for each of the different time segments of the delivered media stream.

18. The scoring node according to claim 10, wherein the memory further comprises instructions that when executed by the processor causes the processor to operate to extract quality-related parameters pertaining to the service delivery delivered in the media stream by extracting a bitrate associated with each different time segment of the media stream.

19. A computer program product comprised on a non-transitory computer readable storage medium, the computer program product comprising instructions that, when executed by a processor of a scoring node arranged to estimate a user's Quality of Experience (QoE) when a service is delivered in a media stream to the user by a communication network, causes the processor to perform operations comprising:
  extracting quality-related parameters pertaining to the service delivery;
  obtaining a set of quality models configured to estimate service quality;
  determining an individual opinion score for each of the quality models in the set by applying each respective quality model in the set on the extracted quality-related parameters wherein determining the individual opinion score comprises determining an individual opinion score for different time segments of the delivered media stream by applying each respective quality model in the set to the extracted quality-related parameters associated with each respective different time segment of the delivered media stream; and
  determining an aggregated opinion score as a weighted average of the individual opinion scores, wherein the aggregated opinion score is used as an estimation of the user's quality of experience for the service delivery,
  wherein the individual opinion scores are determined further based on characteristics of a communication device used by the user for receiving the media stream.

20. The method according to claim 1, further comprising:
  communicating the aggregated opinion to a service evaluation system to modify delivery of a future service in a future media stream through the communication network to a communication device of the user based on the aggregated opinion.

21. The scoring node according to claim 10, wherein the memory further comprises instructions that when executed by the processor causes the processor to operate to communicate the aggregated opinion to a service evaluation system to modify delivery of a future service in a future media stream through the communication network to a communication device of the user based on the aggregated opinion.

22. The computer program product according to claim 19, wherein the processor performs further operations comprising communicating the aggregated opinion to a service evaluation system to modify delivery of a future service in a future media stream through the communication network to a communication device of the user based on the aggregated opinion.

* * * * *

UNITED STATES PATENT AND TRADEMARK OFFICE
CERTIFICATE OF CORRECTION

PATENT NO. : 11,178,024 B2
APPLICATION NO. : 16/852842
DATED : November 16, 2021
INVENTOR(S) : Lundberg et al.

It is certified that error appears in the above-identified patent and that said Letters Patent is hereby corrected as shown below:

In the Specification

In Column 1, Line 9, delete "2016" and insert -- 2016, now Pat. No. 10,666,529, --, therefor.

In Column 5, Line 19, delete "(December 2012)." and insert -- (October 2012). --, therefor.

In Column 10, Line 4, delete "hard drive storage (HDD)," and insert -- hard disk drive (HDD) storage, --, therefor.

In Column 11, in Equation, Lines 33-34, delete

" $err_n(w_1, \ldots, w_M) \times MOS_{subj,n} - MOS_{agg,final,n}(w_1, \ldots, w_M; f_{n,1}, f_{n,2}, \ldots)$ " and insert -- $err_n(w_1, \ldots, w_M) = MOS_{subj,n} - MOS_{agg,final,n}(w_1, \ldots, w_M; f_{n,1}, f_{n,2}, \ldots)$ --, therefor.

Signed and Sealed this
Nineteenth Day of July, 2022

Katherine Kelly Vidal
*Director of the United States Patent and Trademark Office*